April 8, 1924.
E. E. MILLER
EXPANSIBLE PISTON PACKING RETAINER
Filed Feb. 15, 1923
1,489,609
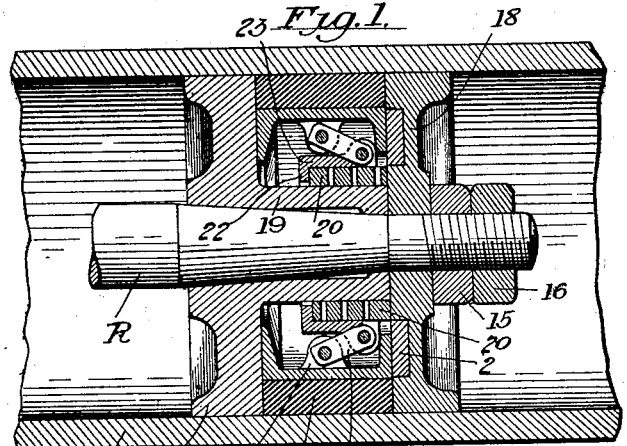
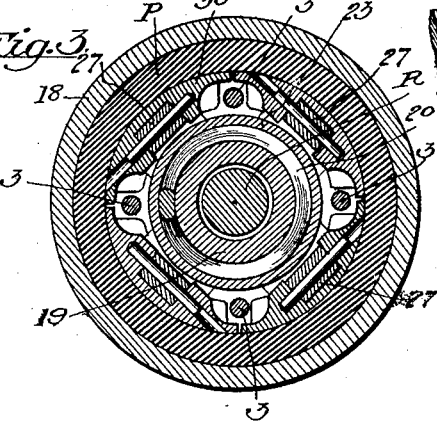 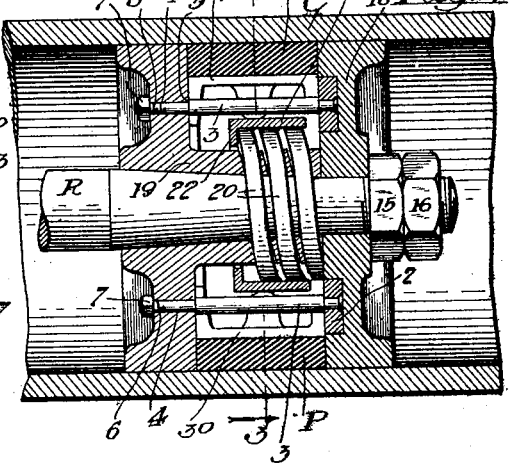
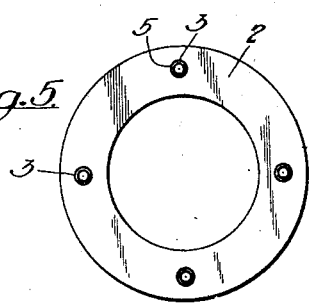 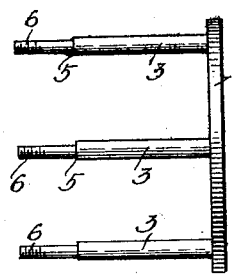
Inventor:
Erwin E. Miller
By Hazard and Miller
Attorneys Patented Apr. 8, 1924.

1,489,609

UNITED STATES PATENT OFFICE.

ERWIN E. MILLER, OF FULLERTON, CALIFORNIA.

EXPANSIBLE-PISTON-PACKING RETAINER.

Application filed February 15, 1923. Serial No. 619,170.

*To all whom it may concern:*

Be it known that I, ERWIN E. MILLER, a citizen of the United States, residing at Fullerton, in the county of Orange and State of California, have invented new and useful Improvements in Expansible-Piston-Packing Retainers, of which the following is a specification.

This invention relates to expansible piston packing.

The present invention relates to improvements in apparatus of the kind disclosed in my copending application Serial No. 554,852, filed April 18, 1922.

An object of the invention is to provide a cage or supporting means for preventing undesirable dislodgment of expanding elements which are operative to expand a surrounding annular packing body. It sometimes happens that through neglect and also from vibration pistons having built up structures, become loosened and in such case the parts are likely to assume undesirable positions and to result in injury to the elements as well as to the cylinder wall.

It is, therefore, a broad object of the invention to provide a cage for preventing dislodgment of certain of the expanding elements.

Other objects and advantages will be made manifest in the following specification of an embodiment of the invention illustrated in the accompanying drawings, wherein—

Figure 1 is an axial section of a piston showing a portion of the pump tubing or casing with the expansible packing.

Fig. 2 is an axial section in a plane at right angles to the plane of Fig. 1.

Fig. 3 is a cross section substantially on line 3—3 of Fig. 2.

Fig. 4 is a side elevation of a form of cage, and

Fig. 5 is an end view of the same.

The organization consists of a piston rod R on one end of which is provided lock nuts 15 and 16 whereby to secure a piston head 17 and a piston disc 18 in rigid position on the piston rod. The piston head 17 has a cylindrical hub 19 on which is slidably mounted a collar 23 providing a chamber to receive a stout expansion spring 20 reacting against a flange 22 inturned on the collar. At suitable locations around the collar are pivoted links 27, and the outer ends of these links are pivoted to expanding quarter cylindrical sections 30; the links lying oblique to the axis of the rod and inclined outwardly with the result that the spring tends to thrust the links and the sections 30 outwardly.

The sections 30 are encompassed by a gasket or packing cylinder P of rubber or other suitable conformable material which, therefore, operates to make a tight joint with the cylinder wall of the cylinder C. This enables the provision of substantial piston members 17 and 18 of somewhat less diameter than the diameter of the cylinder chamber so that the metal parts do not ride on one another.

Should the clamp nuts 15 and 16 work loose, this results in the releasing of the contiguous piston disc or head 18 and permits end play or dislocation of the cylindrical sections 30 which is undesirable, and the present invention consists of means for preventing such undesirable movement of the expanding sections 30 and which serves to guide them for radial movement only. Such a retaining and guide means is shown as consisting of flat annulus 2, Fig. 4, which may be countersunk in the contiguous face of the disc 18. The annulus 2 has projecting from one side a number of bars or pins 3 and these are adapted to pass through apertures 4 provided, therefore, in the piston head 17; the pins being shouldered at 5 and threaded at 6. As shown in Fig. 2 the threaded ends of the pins 3 are provided with nuts 7 whereby they may be secured in position. The length of the shanks of the pins 3 is such as to position the retaining ring 2 contiguous to ends of the cylindrical expanding sections 30, and while allowing these to move inwardly and outwardly prevent appreciable end play and dislocation. The expanding sections 30 are shown in Fig. 3 as being quarter-cylinders and their longitudinal edges are undercut sufficiently to provide ample clearance for the cage pins 3.

From the above it will be seen that I have provided means for retaining the packing elements in position irrespective of the fit or play of piston parts on the piston rod.

Further embodiments, modifications and variations may be resorted to within the spirit of the invention as here claimed.

What is claimed is:

1. A piston comprising spaced heads, a collar between the heads, a rim composed of movable sections having pivotal connections with the collar, a packing ring surrounding the rim, means engaging the collar for normally urging the sections outwardly against the packing ring, and a retaining guide device for the said sections.

2. A piston comprising spaced heads, a collar between the heads, a rim composed of movable sections having pivotal connections with the collar, a packing ring surrounding the rim, means engaging the collar for normally urging the sections outwardly against the packing ring, and a retaining guide device for the said sections, said means consisting of a cage structure carried by the piston.

3. A piston comprising spaced heads, a collar between the heads, a rim composed of movable sections having pivotal connections with the collar, a packing ring surrounding the rim, means engaging the collar for normally urging the sections outwardly against the packing ring, and a retaining guide device for the said sections, said means consisting of a cage structure carried by the piston, and including a cage ring having rods extending along the said sections and being secured to the opposite piston head.

In testimony whereof I have signed my name to this specification.

ERWIN E. MILLER